United States Patent [11] 3,558,807

[72] Inventor Hiromichi Kurokawa
Yokohama-shi, Japan
[21] Appl. No. 734,387
[22] Filed June 4, 1968
[45] Patented Jan. 26, 1971
[73] Assignee Sony Corporation
Tokyo, Japan
a corporation of Japan
[32] Priority June 10, 1967
[33] Japan
[31] 42/37055/67

[54] COLOR VIDEO PICKUP SYSTEM WITH MEANS FOR GENERATING A FREQUENCY MODULATED INDEXING SIGNAL HIGHER IN FREQUENCY THAN THE VIDEO INFORMATION
14 Claims, 9 Drawing Figs.

[52] U.S. Cl. .......... 178/5.4
[51] Int. Cl. .......... H04m 5/42
[50] Field of Search .......... 178/5.4STC, 5.4F

[56] References Cited
UNITED STATES PATENTS

| | | | |
|---|---|---|---|
| 3,407,265 | 10/1968 | Krause | 178/5.4STC |
| 2,787,655 | 4/1957 | Stahl et al. | 178/5.4STC |
| 2,917,574 | 12/1959 | Toulon | 178/5.4STC |
| 3,001,012 | 8/1961 | Braicks | 178/5.4STC |
| 3,002,051 | 8/1961 | Tait | 178/5.4STC |
| 3,213,190 | 9/1965 | Mutschler | 178/5.4F |

*Primary Examiner*—Robert L. Griffin
*Assistant Examiner*—Donald E. Stout
*Attorneys*—Albert C. Johnston, Robert E. Isner, Lewis H. Eslinger and Alvin Sinderbrand

ABSTRACT: In a color video signal generating apparatus in which a filter having regions respectively selecting light of different wavelength ranges and a screen having separating lenses are optically interposed between an object to be televised and a single image pickup tube to cause such separating lenses to coact with the filter in dividing an image of the object into color components which are projected onto said tube in such manner that said color components when successively encountered in the line scanning direction can respectively become chrominance signals having a predetermined color subcarrier frequency and being of the same frequency band, there are provided index image forming means to form index images on the image pickup tube which, when successively encountered in the line scanning direction, produce in the tube output frequency or angle modulated index signals having a carrier frequency which bears a predetermined relationship to the color subcarrier frequency and a frequency band which is different than the frequency band of the chrominance signals, and the positions of the respective color components in the chrominance signals are indicated by the index signals to permit the extraction from the tube output of color video signals.

INVENTOR.
HIROMICHI KUROKAWA
BY
Lewis H. Eslinger
ATTORNEY

INVENTOR.
HIROMICHI KUROKAWA
BY
Lewis H. Eslinger
ATTORNEY

COLOR VIDEO PICKUP SYSTEM WITH MEANS FOR GENERATING A FREQUENCY MODULATED INDEXING SIGNAL HIGHER IN FREQUENCY THAN THE VIDEO INFORMATION

This invention relates to color video signal generating apparatus and, more particularly, to color video signal generating apparatus which provide a plurality of color component images on image pickup means.

In the color video signal generating apparatus of the prior art, it is generally found that color component signals are provided which are representative of chrominance signals having different frequency bands. As a result, the passage of such color component signals through extraction circuit means comprising circuit components in the nature of amplifiers, or the like, which have distinct frequency response curves, can result in the said color component signals being effected to different degrees by the said extraction circuit components to thereby destroy the white balance of the displayed color picture. Further, in prior art apparatus wherein it is attempted to provide color component signals representing chrominance signals having the same frequency bands, it then becomes necessary to provide one or more standard or index signals to indicate the position of the color components of the said chrominance signal, and this may be understood to lead to difficulty in the formation of the index signal at a frequency band which will not adversely limit the available frequency band areas for the luminance and chrominance signals to prevent sufficient broadening of the latter. An additional difficulty resides in the possibility that an image of the index signal may appear in the picture displayed to thus render the latter obviously unsatisfactory. Too, in such instances, it is also essential that the frequency band of the modulated index generating signal be an integral number of times as large as the frequency of the index signal.

It is, accordingly, an object of this invention to provide color video signal-generating apparatus wherein each color component signal is formed within the same frequency band and arranged to become a chrominance signal whereby color pictures having satisfactory white balance will be obtained.

Another object of this invention is to provide color video signal-generating apparatus wherein the frequency bands of the luminance and chrominance signals are of relatively large band width.

Another object of this invention is to provide color video signal-generating apparatus wherein the frequency band of the modulated index signal need not be an integral number of times as large as the frequency of the index signal.

Still another object of this invention is to provide a color television camera wherein is employed only a single vidicon tube, and which may be of small size and of relatively low cost of manufacture.

Still another object of this invention is the provision of a color television camera providing for the display of color pictures of high resolution and wherein display of the image of the index signal in the color picture is prevented even when an image pickup tube with a relatively low upper frequency limit is employed.

As disclosed herein, the invention is applied to a color video signal-generating apparatus comprising image pickup means having scanning means and being operative to photoelectrically convert light projected thereon into electrical output composed of successive signals corresponding to the intensities of light successively encountered by the scanning means. Filter means are interposed optically between an object to be televised and the image pickup means, and the filter means comprise a plurality of filter regions which are operative, respectively, to select light of different wavelength ranges. A screen is interposed between the filter means and the image pickup means, and the screen coacts with the filter means in dividing an image of the object into respective color components which are projected onto the image means in such manner that each of the color components becomes a chrominance signal having the same frequency band as the other chrominance signals. In accordance with this invention, apparatus as generally described above is provided with index image forming means for forming stripelike index signals on the image pickup means to obtain angle-modulated index signals having a carrier frequency in a predetermined relationship with the color subcarrier frequency of the chrominance signals and a frequency band which is different from the frequency band of the chrominance signals. Extraction circuit means are provided which employ the index signals for differentiating between the chrominance signals corresponding to the respective color components, thereby to extract color video signals from the output of the image pickup means.

In accordance with a feature of this invention, the said screen comprises spaced separating lenses which coact with the said filter means for dividing an image of the object into respective color components which are projected onto the said image pickup means, and nonseparating portions which are disposed between the said separating lenses and through which a panchromatic image of the object is projected on the said image pickup means in overlapping relationship with said color components to thereby result in the provision of luminance signals corresponding to said panchromatic image.

In accordance with another feature of this invention, means for forming an index image are formed integrally with said filter means in predetermined relationship with the latter, and said index image forming means comprise transparent regions and nontransparent regions which are alternately arranged in adjacent relationship and which undergo gradual changes in the respective widths thereof, whereby signals corresponding to the black-and-white image formed on the image pickup means by the light passing through said transparent regions will provide the angle-modulated index signal.

In accordance with another feature of this invention, the color video signal extraction circuit means comprise band pass filters which receive the image pickup means output and respectively pass signals of different frequency ranges to separate the said output into at least the chrominance and index signal.

In accordance with still another feature of this invention, the selective filter regions are of substantially equal width and are disposed in side-by-side relationship in the line scanning direction, and the selective filter regions which select one color component occur in the filter with the same frequency as that of the selective filter regions to select other color components, whereby the said color components will be provided within the same frequency band to in turn more readily provide the chrominance signal.

The above and other objects and advantages of this invention are believed made clear by the following detailed description thereof taken in conjunction with the accompanying drawings wherein.

Figure 1:
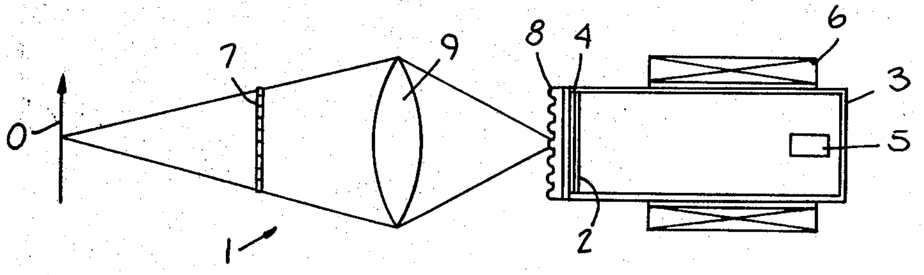
FIG. 1 is a schematic top view illustrating a color video signal-generating apparatus constructed in accordance with the principles of a plurality of my copending applications for U.S. Patent as identified hereinbelow.

Referring now to FIG. 1 of the drawings, apparatus for generating color video signals constructed generally in accordance with the principles of copending applications for U.S. Pat, Ser. No. 657,139, filed Jul. 31, 1967, now U.S. Pat. No. 3,502,799, Ser. No. 646,045, filed Jun. 14, 1967, Ser. No. 645,727, filed Jun. 13, 1967, now U.S. Pat. No. 3,526,706, and all assigned to the assignee hereof, are indicated generally at 1. Briefly described, for purposes of providing a clearer background for the description of this invention, the apparatus 1 comprises a single image pickup tube 3 in the nature, for example, of a vidicon tube, a color filter 7, a camera or objective lens 9, and a lens screen 8, relatively disposed as shown.

The image pickup tube 3 includes a transparent electrode 4, the inner surface of which is coated with a photoconductive layer 2 formed, for example, of PbO. Electron gun means 5 are disposed as shown adjacent the end of the image pickup tube 3 remote from the photoconductive layer 2 and function to emit an electron beam which is focused on the said photoconductive layer and is caused to scan the surface of the latter by operation of electron beam deflection means as indicated at 6.

Conventional, nonillustrated electronic circuit components, which form no part of this invention, are connected to the electron beam scanning means 6 in the usual manner to effect the electron beam scanning of the photoconductive layer 2 by horizontally oscillating the electron beam and successively vertically displacing the beam between its successive oscillations so that the entire useful area of the photoconductive layer 2 is cyclically covered by a series of the successive horizontal beam oscillations. As a result of this scanning, the electrical output from the electrode 4 will be composed of sequential signals which represent the object, as indicated at 0, to be televised.

The color filter 7 is disposed as shown at a predetermined distance from the photoconductive layer 2 with the respective surfaces thereof being substantially parallel.

Figure 2:
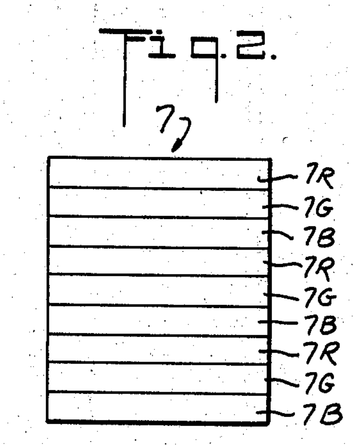
FIG. 2 is a schematic diagram illustrating the color filter employed in the apparatus of FIG. 1.

The lens screen 8 comprises an assembly of cylindrical lenses **8*a*, commonly referred to as "lenticules," and arranged as best seen in FIG. 2 at regularly spaced intervals with the longitudinal axes thereof being substantially parallel. The lens screen 8 may be formed as an integral member by properly molding the cylindrical lenses 8*a* as a unit from any suitable material in the nature, for example, of glass, acrylic resin, or the like. The thusly formed lens screen 8 is secured to the front surface of the image pickup tube 3 by a suitable adhesive binder and is so disposed relative to the said front surface so that the respective longitudinal axes of the cylindrical lenses 8*a* extend vertically, that is to say, at right angles, to the horizontal scanning direction of the electron beam on the photoconductive layer 2. Although it is, of course, possible to form the lenticules or cylindrical lenses 8*a* directly on the front surface of the image pickup tube 3, it may be understood, however, that such direct lens screen formation is not as feasible from a manufacturing point of view as is the arrangement described wherein the lens screen 8 is separately formed and secured as described above to the front surface of the image pickup tube 3**.

Although depicted schematically as a simple, single lens element, the camera or objective lens 9 would, in practice, be constituted by a multielement lens for achieving the desired optical performance characteristics. As utilized in practice, the camera lens 9 functions to focus a real image of the object 0 which is to be televised on the photoconductive layer 2, and photographic tests are normally employed to determine the optimum focusing position for the camera lens 9 relative to the said photoconductive layer.

Figure 3:
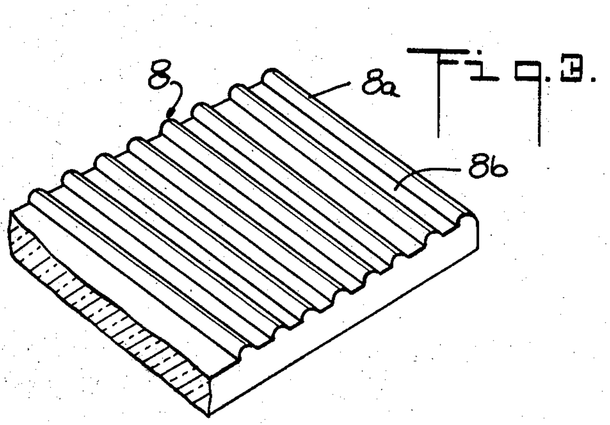
FIG. 3 is a perspective view schematically illustrating a lens screen employed in the apparatus of FIG. 1.

As best seen in FIG. 3, the lens screen 8 further comprises generally flat, non lens portions **8*b* which space the cylindrical lenses 8*a* and through which panchromatic images of the object 0 are focused on the photoconductive layer 2 so as to be overlapped by the separated color images of the object 0 projected on the former by the cylindrical lenses 8*a*. The thusly projected, separated color images are such that the image of the object 0 is separated into stripelike image elements in particular patterns of intensity in accordance with the colors at the respective positions in the object, and it may be understood that the separated color images are of lower resolution in the line scanning direction than are the thusly projected panchromatic images. However, since the acuity of the human eye for color changes is lower than for luminance changes, the color video signal that is obtained is of high resolution. The respective surfaces of the flat portions 6*b* may be formed from ground glass or may, alternatively, be arranged so that the incident light passing therethrough from the object 0 to be televised may be spread and projected over the photoconductive layer 2**. This will result in slight blurring of the object image to thus block the higher frequency band components of the luminance signal.

As seen in FIG. 2, the color filter 7 comprises alternate stripelike red, green, and blue filter regions as indicated at 7R, 7G and 7B, respectively, there being three of each of said filter regions. The red color filter regions 7R permit primarily the passage of red color light therethrough, while the green filter regions 7G primarily permit the passage of green colored light therethrough, and the blue color filter regions 7B primarily permit the passage of blue colored light therethrough. The respective color filter regions 7R, 7G and 7B are of substantially equal width and are arranged in the depicted side-by-side manner to extend in substantially the same longitudinal directions as do the respective cylindrical lenses **8*a* and flat portions 8*b* of the lens screen 8**.

If the focal length of the camera lens 9 is F, the focal length of each of the cylindrical lenses **8*a* is F′, the pitch of each cylindrical lens 8*a*, that is to say, the distance between the centers of an adjacent pair of the said cylindrical lenses, is taken as D′, and the width of the color filter 7** is taken as D, the relationship $$\frac{D'}{D}=\frac{F'}{F}$$

will result.

Figure 4:
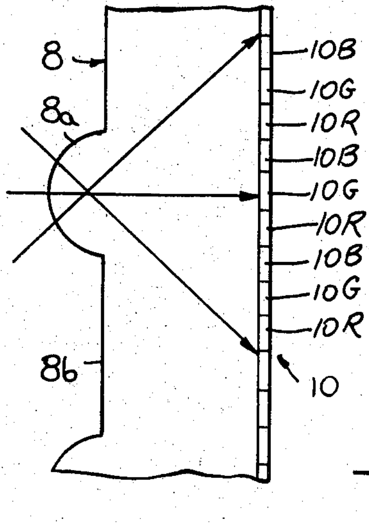
FIG. 4 is a schematic diagram illustrating the manner in which color separation is effected by the lens screen of FIG. 3 and the color filter of FIG. 2.

With the thusly described construction, it may be understood that, as seen in FIG. 4, a real image 10 of the color filter 7 will be successively formed on the photoconductive layer 2 for each of the cylindrical lenses **8*a*. As a result, each part of the object 0 is resolved into a stripelike image for each of the cylindrical lenses 8*a*, and each part of the object 0 thus resolved is further resolved into stripes by the color filter elements which extend in the longitudinal direction of the already received stripes. More specifically, the image of the color filter 7 passing through each cylindrical lens 8*a* is projected on the photoconductive layer 2 at a stripelike area which extends at right angles to the longitudinal axis of the said lens 8*a* as seen in FIG. 4. That is to say that the incident light passing through each cylindrical lens 8*a* from the object 0 is separated into color components by the color filter 7 and projected onto a corresponding area of the photoconductive layer 2. Thus, for the color filter 7 of FIG. 2, it may be understood that the red color component of the incident light passes primarily through the three red color filter elements 7R, so that three color filter images 10R are formed by each cylindrical lens 8*a* on the photoconductive layer 2. In like manner, the green color component of the incident light passes primarily through the three green color filter elements 7G, so that three color images 10G thereof are formed by each cylindrical lens 8*a* on the photoconductive layer 2, while the passage of the blue color component of the incident light primarily through the three blue color filter regions 7B will result in the formation of three color images 10B per lens 8***a* on the photoconductive layer 2.

Figure 5:
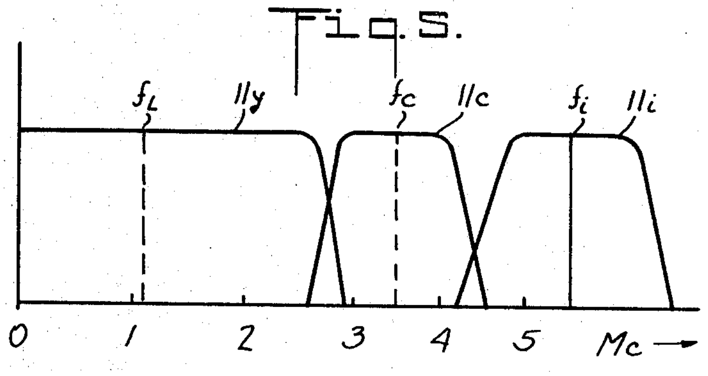
FIG. 5 is a diagram showing the frequency spectre of the color video signals produced by the apparatus of this invention.

As a result, when the photoconductive layer 2 upon which the thusly resolved color images have been formed as discussed above, is scanned by the electron beam in such manner that the line scanning direction is at right angles with respect to the longitudinal axis of the cylindrical lenses 8*a*, color video signals will be produced at the electrode 4. As seen in FIG. 5, this color video signal will consist of the chrominance signal as indicated at 11*c*, and the luminance signal as indicated at 11*y*, it being understood that the use of the color filter 7 will not provide an index signal in this color video signal.

If the lens frequency $f_1$, which indicates the product of the number of the cylindrical lenses 8*a* or the number of the flat portions 8*b* and the line scanning frequency of the electron beam, is, for example, 1.2 mc. the chrominance signal 11*c* will result in a color subcarrier frequency $f_c$ of 1.2 mc. × 3 or 3.6 mc. as modulated by each other component signal, because each of the color component images 10R, 10G and 10B is successively formed three times for each of the cylindrical lenses 8*a* as discussed hereinabove. As discussed hereinabove, it may be understood that by forming the flat portions 8*b* of the lens screen 8 from ground glass, or be setting the camera lens 9 in a slightly defocused condition, the high frequency band components of the luminance signal 11*y* as obtained by the flat lens screen portions 8*b* will fall below the frequency band of the chrominance signal 11*c*.

Figure 6:
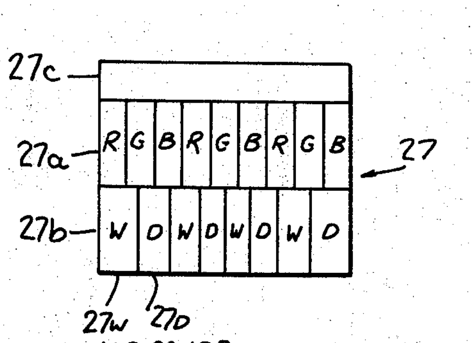
FIG. 6 is a schematic diagram illustrating a color filter constructed in accordance with the principles of this invention and includes the depiction of index image forming means which are integral therewith.
Figure 8:
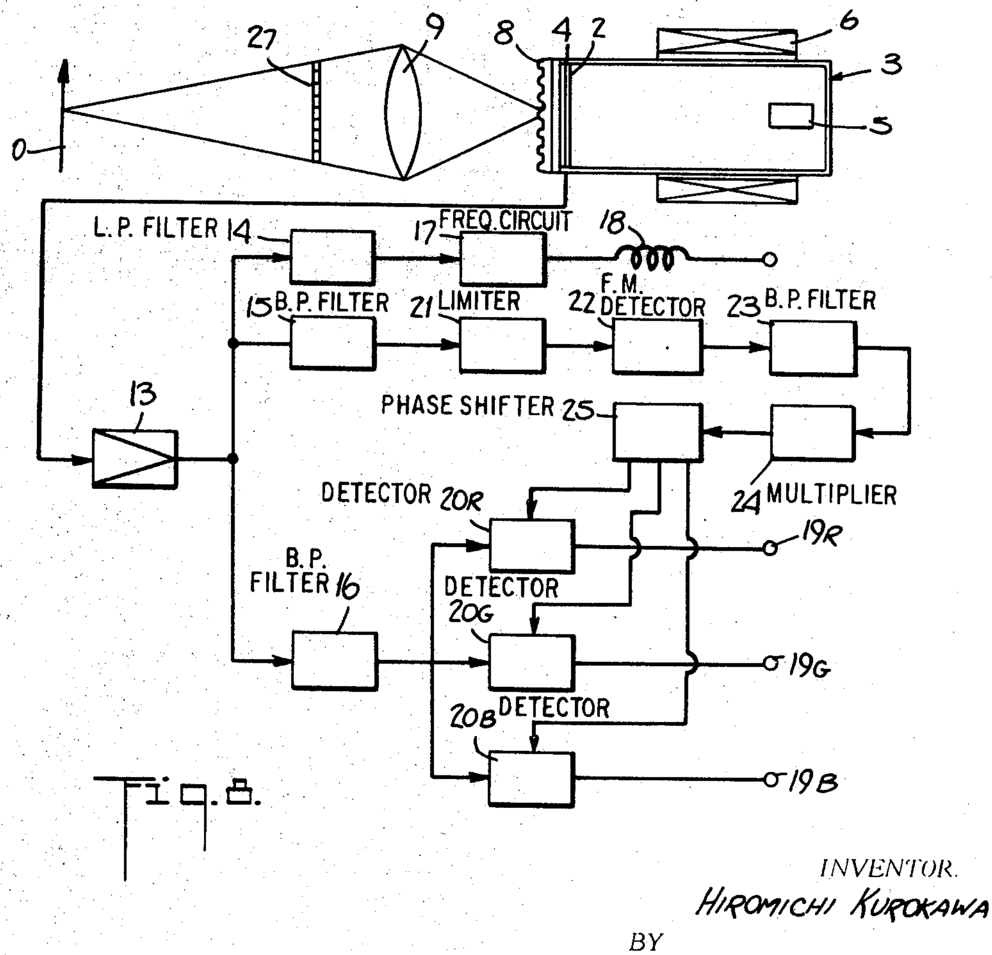
FIG. 8 is a schematic top view illustrating a color video signal-generating apparatus constructed in accordance with the principles of this invention.

Referring now to FIG. 6, the color filter for use in the apparatus of this invention, as depicted in FIG. 8, is indicated at 27 and comprises a color separating portion 27*a* which is formed in much the same manner as the color filter 7 of FIG. 2 in that the former may be seen to include alternate red, green and blue color filter elements arranged as discussed hereinabove. In addition, to provide index image-forming means for the generation of an index signal to indicate the position of a color component to be selected, the filter 27 may be seen to comprise an index-forming position 27*b* which includes stripelike transparent regions 27*w*, and stripelike nontransparent regions 27*d*, successively arranged as shown in side-by-side relationship with four of each of said regions being provided. The index forming portion 27*b* is disposed to one side of the color filter regions 27R, 27G and 27B, in contact with the respective corresponding extremities thereof.

The color filter 27 further includes a stripelike color corrective portion 27*c* which is disposed as shown to extend longitudinally at right angles with the respective longitudinal directions of the color filter regions 27R, 27G and 27B, with the said color corrective portion being in contact with the corresponding opposite extremities of the said color filter regions.

The respective widths of the transparent regions 27*w* and the nontransparent regions 27*d* are gradually decreased, and then gradually increased, as shown, in the direction taken across the filter 27, and it may be understood that the degree of change in the transparent and nontransparent region widths is kept relatively small so as to prevent the degree of modulation from becoming too large.

The center frequency or carrier frequency of the modulated index signal 11*i* (FIG. 5) to be provided by the color filter 27 is determined by the number of the respective transparent regions 7*w* and the nontransparent regions 7*d*, and the color filter 27 is arranged so that the center frequency or carrier frequency $f_i$ will be 5.5 mc. With regard to the color corrective portion 27*c* of the color filter 27, it may be understood that the wavelength range of the light which will pass therethrough is selected so that the color components of the luminance signal 11*y* may be distributed at predetermined ratios.

Figures 7A, 7B:
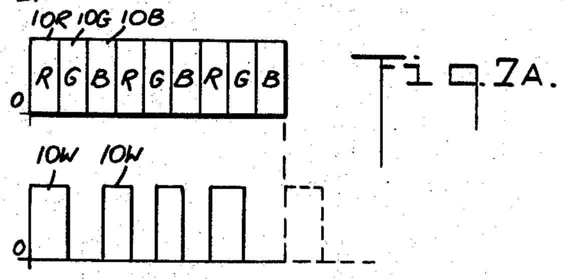
FIG. 7A is a schematic diagram illustrating the distribution of the color component images formed on the image pickup means of this invention.
FIG. 7B is a schematic diagram illustrating the black and white index images formed on the image pickup means of this invention.

With the use of the color filter 27 of FIG. 6 in the color video signal-generating apparatus 40 of FIG. 8, and assuming the object 0 to represent a white color picture, it may be understood that in addition to the color component images 10R, 10G and 10B as seen in FIG. 7A, a bright black and white image 10 *w* corresponding to each transparent region 27*w* of the index forming portion 27*b* of the filter 27 will be formed by each cylindrical lens 8*a*. Since the respective cylindrical lenses 8*a* will not act to refract the incident light in the longitudinal direction thereof, an image which overlaps the color component images 10R, 10G and 10B of FIG. 7A, and the black and white image 10 *w* of FIG. 7B, will be formed on the photoconductive layer 2.

Electron beam scanning of the photoconductive layer 2 with the respective color component and black and white images formed thereon as discussed above, will result in the formation, at electrode 4, of repeated sequences of the luminance signal 11*y* and the chrominance signal 11*c* which is, of course, based upon the color component images 10R, 10G and 10B. Simultaneously, the index signal 11*i* which is based upon the stripelike black and white image 10*w* will be obtained in repeated sequence. The index signal 11*i* is a frequency modulated wave which provides for frequency modulation of a carrier which is obtained from the aforementioned repetitive sequencing, at a frequency $f_i$ of 5.5 mc. through use of the signal wave which in turn has a frequency equal to the lens frequency $f_1$ of 1.2 mc. In this instance, if it is assumed that the frequency deviation is 0.6 mc., based upon a degree of modulation which is less than 0.5, the frequency modulated index signal 11*i* will be in the range of 5.5 mc. ± 1.2 mc., or carrier frequency ± signal wave frequency, to insure that the frequencies of the thusly modulated wave components will not fall within the frequency band of the chrominance signal 11*c* or the luminance signal 11*y*.

Through FM detection of the thusly obtained frequency modulated index signal 11*i*, an index signal at the lens frequency will be obtained. Further, since in this instance, the index signal 11*i* and the chrominance signal 11*c* are in a given phase relationship, it thus becomes possible to separate the said chrominance signal, comprising the respective color components, into the latter on the basis of the said index signal. Thus, as seen in FIG. 5, the index signal 11*i* which falls within a frequency band different from the frequency band of the chrominance signal 11*c*, may be inserted as a modulated wave into the color video signal to separate the respective color components of the chrominance signal 11*c*. Thus it may be understood whereby the index signal 11*i* is constituted by an angle modulated wave, that is to say it is provided by angle modulating the third carrier with the index signal as the signal wave. In this instance, the frequency $f_i$ of the index signal is selected to be in predetermined relationship with the frequency $f_c$ of the color subcarrier.

Referring now to the color video signal generating apparatus constructed in accordance with the principles of this invention as depicted in FIG. 8, it may be seen that the color video signal provided at the transparent electrode 4 of the image pickup tube 3 as discussed hereinabove, is initially fed to a video amplifier 13 for amplification by the latter. Therefrom, the amplified color video signal is supplied to low-pass filter means 14 which are provided to obtain the luminance signal 11*y* therefrom, and have a cutoff frequency, for example, of 3 mc. Simultaneously, the thusly amplified color video signal is supplied to band pass filter means 15 which are provided for obtaining the modulated index signal 11*i* therefrom and have a band pass of 5.5 mc. ± 1.2 mc. and the thusly amplified color video signal is also applied to the band pass filter 16 which is provided to separate the chrominance signal 11*c* therefrom, and which has a band pass of 3.6 mc. ± 0.6 mc.

The output of the low pass filter means 14 is applied in turn through a frequency corrective circuit 17 and a delay circuit 18, as required, to thereby provide the luminance signal 11*y* as an output at terminal 19*y*. The output of the filter means 16 is applied as indicated to each of the synchronous detector circuit means 20R, 20G and 20B to separate the chrominance signal 11*c* therefrom, while the output of the filter means 15 is applied as indicated to amplitude limiting means 21 to limit the amplitude thereof. The thusly amplitude-limited, detected output is then applied to a FM detector 22 and a narrow band pass filter means 23 having a narrow band, e.g., 1.2 mc. ±40 kc., centering on the demodulated index signal frequency of 1.2 mc. to thereby result in the separation of the index signal by the narrow band pass filter means 23.

The thusly separated demodulated index signal is multiplied to the color subcarrier frequency $f_c$ of 3.6 mc. by means of the frequency multiplier 24, and the thusly frequency-multiplied index signal is then applied to phase shifting means 25 to result in three signals at respectively different phases. These three phase-shifted signals are applied in turn to the synchronous detector circuit means 20R, 20G and 20B to result in the provision of the red component signal at terminal 19R, the green component signal at terminal 19G, and the blue component signal at terminal 19B.

Because each of the thusly obtained color component signals has been provided by the separation of the chrominance signal of a signal frequency band, it may be understood that even though the said color component signals have been passed through the video amplifier 13 with predetermined frequency response curve characteristics, each of the said color component signals will be influenced to approximately the same extent by the said amplifier whereby may be understood that no breakdown of the white balance will occur to insure favorable color pictures enjoying good white balance at all times. Moreover, because the index signal 11*i* which is used as discussed hereinabove to separate each color component signal from the chrominance signal of a single frequency band, has a frequency band which is different from that of the chrominance signal, and that of the luminance signal, this enables the frequency band of the index signal to be made relatively narrow and makes possible full utilization of the frequency band of the image pickup tube 3 which has a relatively low upper frequency characteristic limit. As a result, it is insured that the index signal will not appear as an image in the reproduced color pictures.

In addition, since it is made possible to employ a frequency band with poor frequency characteristics for the index signal 11*i*, and since this frequency band falls at a higher level than those of the chrominance signal 11*c* and luminance signal 11*y*, respectively, all as made clear by FIG. 5, the respective frequency bands of the chrominance signal and the luminance signal can be widened as much as possible within respective frequency bands of good frequency characteristics to thereby enable the provision of color pictures with extremely high resolution. Further, since the modulated index signal is angle modulated, the frequency band thereof need not be an integral multiple of the frequency of the index signal, whereby full discretion can be utilized in the selection of the former. Too, it may be understood that if each filter region of the color filter 27 is maintained at a given condition, if the amplitude of each color component is set in proper proportion, and if the phase angle of the standard signal at the time of synchronous detection thereof is set at a proper value, it becomes possible to obtain a variety of chrominance or color-different signals.

As disclosed hereinabove, red, green and blue are employed in the provision of the respective color filter regions 27R, 27G and 27B, but it is to be understood that colors in the nature of cyanine, magenta and yellow may be employed instead. In addition, although as disclosed herein, the modulated index signal is provided by a frequency modulated wave, it is to be understood that the same may alternatively be provided by a phase modulated wave. Further, an electroluminescent material may be employed as the transparent region 27*w* of the color filter 27 to prevent the index signal 11*i* from being influenced by the index frequency component of the luminance signal 11*y*. Too, although the color filter 27 is disclosed as comprising stripelike image forming means integral therewith, it is to be understood that the same are not always required and that other means may be employed to form the stripelike black and white image 10*w* as illustrated in FIG. 7B on the photoconductive layer 2.

It will be apparent that many modifications and variations in addition to those noted above may be effected in the described embodiment without departing from the spirit and scope of this invention as defined in the appended claims.

I claim:

1. A color video signal-generating apparatus comprising image pickup means having scanning means and being operative to photoelectrically convert light projected onto said image pickup means into an electrical output composed of successive signals corresponding to the intensities of light successively encountered by said scanning means in a line scanning direction, filter means interposed optically between an object to be televised and said image pickup means, said filter means having several regions respectively selecting light of different wavelength ranges, a screen interposed between said filter means and said image pickup means, said screen coacting with said filter means for dividing an image of the object into respective color components which are projected onto said image pickup means to produce in said output respective chrominance signals having a predetermined color subcarrier frequency and the same frequency band, index image-forming means for forming index images on said image pickup means which, when encountered in said line-scanning direction, produce in said output angle modulated index signals having a carrier frequency which bears a predetermined relationship with said color subcarrier frequency and having a frequency band which is different than the frequency band of said chrominance signals, and means employing said index signals to identify said chrominance signals corresponding to the respective color components and being operative to extract color video signals from the output of said image pickup means.

2. A color video signal-generating apparatus as in claim 1, wherein index image-forming means projects said index images through said screen so as to be superimposed on said color components into which said object image is divided.

3. A color video signal-generating apparatus as in claim 1, wherein the frequency of said index images on the image pickup means varies gradually in said line-scanning direction for achieving the angle modulation of said index signals.

4. A color video signal-generating apparatus as in claim 1, wherein said screen comprises spaced, separating lenses for the coaction with said filter means in dividing an image of the object into said respective color components, and nonseparating screen portions which are disposed between said separating lenses and through which a panchromatic image of the object is projected onto said image pickup means in overlapping relationship with said respective color components for providing luminance signals in said output.

5. A color video signal-generating apparatus as in claim 1, wherein said index image-forming means comprise transparent regions and nontransparent regions interposed optically between said object to be televised and said image pickup means, said transparent and nontransparent regions being arranged in alternating, side-by-side relationship and having respective widths which change gradually in said line-scanning direction whereby to correspondingly change the frequency of the black and white index images formed on said image pickup means by light passing through said transparent regions.

6. A color video signal-generating apparatus as in claim 5, wherein said index image-forming means are formed integrally with said filter means.

7. A color video signal-generating apparatus as in claim 5, wherein said screen comprises spaced, separating lenses for the coaction with said filter means in dividing an image of the object into said respective color components, and nonseparating screen portions which are disposed between said separating lenses and through which a panchromatic image of the object is projected onto said image pickup means in overlapping relationship with said respective color components for providing luminance signals in said output.

8. A color video signal-generating apparatus as in claim 7, wherein said index image-forming means are formed integrally with said filter means.

9. A video signal-generating apparatus as in claim 8, wherein said light-selective regions of said filter means are of equal width and are disposed in side-by-side relationship in said line-scanning direction, and said regions to select light of one wavelength occur in said filter means with the same frequency as said regions to select light of a different wavelength range.

10. A color video signal-generating apparatus as in claim 1, wherein said means for extracting color video signals from the output of said image pickup means comprise band pass filter means for receiving said output and respectively passing signals of different frequency ranges to separate the chrominance and index signals in the said output.

11. A video signal-generating apparatus as in claim 1, wherein said light-selective regions of said filter means are of equal width and are disposed in side-by-side relationship in said line-scanning direction, and said regions to select light of one wavelength range occur in said filter means with the same frequency as said regions to select light of another wavelength range.

12. A color video signal-generating apparatus as in claim 1, in which said carrier frequency of the index signals is greater than said color subcarrier frequency.

13. In a color video signal-generating apparatus of the type including image pickup means having scanning means and being operative to photoelectrically convert light projected onto said image pickup means into an electrical output composed of successive signals corresponding to the intensities of light successively encountered by said scanning means in a line-scanning direction, and means for projecting onto said image pickup means an image of the object to be televised, which image is divided into color components arranged side by side in said scanning direction to produce in said output respective chrominance signals of the same frequency band and a predetermined color subcarrier frequency; the improvement comprising means to project onto said image pickup means index images which, when encountered in said line-scanning direction, produce in said output angle modulated index signals having a carrier frequency greater than said color subcarrier frequency and a frequency band different from said frequency band of the chrominance signals, and means identifying said chrominance signals corresponding to the respective color components in accordance with said index signals and being operative to extract color video signals from said output of the image pickup means.

14. A color video signal-generating apparatus according to claim 13, in which said means to project index images is interposed optically between said object to be televised and said image pickup means and includes transparent and nontransparent regions arranged in alternating, side-by-side relationship in said line-scanning direction and having respective widths which change gradually in said line-scanning direction whereby to gradually change the frequency of the index signals which result from the images formed by light passing through said transparent regions.